United States Patent Office 3,689,474
Patented Sept. 5, 1972

3,689,474
7-MERCAPTO-7-DEOXYLINCOMYCINS AND PROCESS FOR PREPARING THE SAME
Fred Kagan, Kalamazoo, and Barney J. Magerlein, Portage, Mich., assignors to The Upjohn Company, Kalamazoo, Mich.
No Drawing. Continuation-in-part of application Ser. No. 725,531, Apr. 30, 1968. This application Aug. 4, 1970, Ser. No. 60,929
Int. Cl. C07g 11/00
U.S. Cl. 260—210 R        11 Claims

ABSTRACT OF THE DISCLOSURE

Antibacterial compounds of the formula:

are prepared by heating a compound of the formula:

an inert solvent in the presence of an acid acceptor, the 2-, 3-, and 4-hydroxy group may be covered with protective groups, to form a novel compound of the formula:

and heating it with hydrogen sulfide in an inert solvent to form a compound of the formula:

which on acylation yields compounds of Formula I.

CROSS REFERENCE TO RELATED APPLICATION

This application is a continuation-in-part of our co-pending application Ser. No. 725,531, filed Apr. 30, 1968, now U.S. Pat. 3,544,551, granted Dec. 1, 1970.

BRIEF SUMMARY OF THE INVENTION

This invention relates to novel processes for making 7-mercapto-7-deoxylincomycins, and analogs thereof and to novel intermediates produced therein.

The novel process of the invention and the novel intermediates produced therein are represented in the following sequence:

In this process R is the radical of a mercaptan, $$R_4\overset{O}{\underset{\|}{C}}-$$

is the acyl moiety of lincomycin and Halo is chlorine, bromine, or iodine. R advantageously is alkyl of not more than 20 carbon atoms, advantageously not more than eight carbon atoms; cycloalkyl of not more than 8 carbon atoms; or aralkyl of not more than 12 carbon atoms.

Any or all of the 2-, 3-, and 4-hydroxy groups as well as the —SH group can be esterified or etherified as more particularly described in the parent application.

Examples of alkyl of not more than 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl. Examples of aralkyl are benzyl, phenethyl, α-phenylpropyl, and α-naphthylmethyl.

When the 7(S)-epimer of Compound II, which has the following formula:

is used as the starting compound, the 7(R)-epimer of Compound III having the following structure.

is obtained. When the 7(R)-epimer of compound II, which has the following formula:

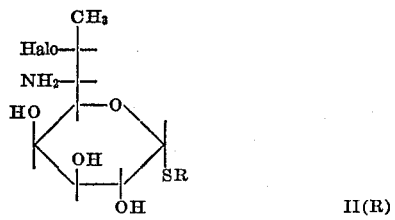

is used as the starting compound, the 7(S)-epimer of compound III having the following structure

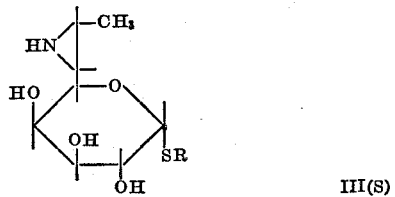

is obtained.

The 7(S)-epimer of compound III, Formula III(S), is also obtained from the more polar fractions of Example 1, U.S. Pat. 3,502,648.

When the 7(R)-epimer of compound III is reacted with hydrogen sulfide, the 7(S)-epimer of compound IV having the formula

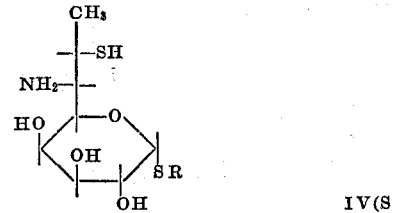

is obtained. When the 7(S)-epimer of compound III is reacted with hydrogen sulfide, the 7(R)-epimer of compound IV having the formula

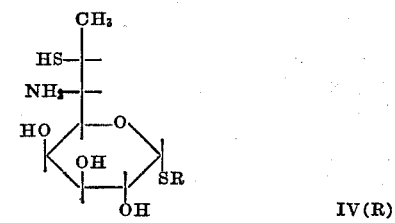

is obtained.

The starting compounds of Formula II are found in U.S. Pat. 3,502,648.

DETAILED DESCRIPTION

The novel intermediates of Formula III are prepared by dehydrohalogenation of compounds of Formula II. This suitably is effected by heating a compound of Formula II with an acid acceptor in a solvent. Suitable acid acceptors include anhydrous sodium carbonate, potassium carbonate, triethylamine, collidine, and potassium hydroxide. Suitable solvents are dimethylformamide, dimethyl sulfoxide, ethyleneglycol, benzene and alcohol. The temperature can range from about 25° C. to about the boiling point of solvent.

The novel intermediates of Formula III are converted to a compound of Formula IV by heating in an inert solvent under a pressure of hydrogen sulfide. Suitably the compound of Formula III is mixed with 2-propanol, or like solvent, saturated with hydrogen sulfide and heated in a bomb at a temperature of about 100° C. Higher or lower temperatures, say from about 25° C. to about 150° C., can be used.

The intermediates of Formula III exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, muic, amphoric, glutaric, glycolic, phthalic, tartaric, lauric, stearic, salicylic, 3 - phenylsalicylic, 5 - phenylsalicylic, 3 - methylglutaric, orthosulfobenzoic, cyclopentanepropionic, 1,2 - cyclohexanedicarboxylic, 4 - cyclohexanecarboxylic, octadecenylsuccinic, octenylsuccinic, methanesulfonic, benzensulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases of Formula III can be used as a buffer or as an antacid. The compounds of Formula III react with isocyanates to form urethanes and can be used to modify polyurethane resins. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The novel intermediates of Formula III are also useful for preparing 7-mercapto-7-deoxy-α-thiolincosaminides of Formula IV which are described and claimed in the parent application.

The following examples are illustrative of the process and products of the present invention but are not to be construed as limiting. The parts and percentages are by weight and the solvent ratios are by volume unless otherwise specified.

EXAMPLE 1

7(S)-mercapto - 7 - deoxylincomycin [methyl 7-mercapto-6,7,8-trideoxy - 6 - (trans-1-methyl-4-propyl-L-2-pyrrolidinecarboxamido) - 1 - thio - L - threo-α-D-galacto-octopyranoside]

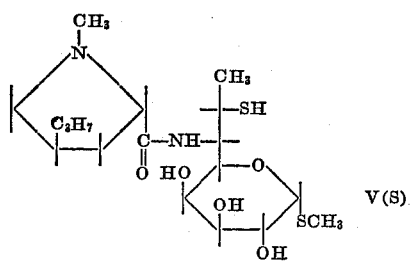

PART A-1

Methyl 6,7(R)-aziridino-7-deoxy-α-thiolincosaminide

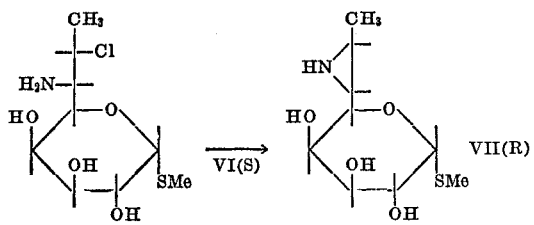

A mixture of 1 g. of methyl 7(S)-chloro-7-deoxy-α-thiolincosaminide (Example 1, U.S. Patent 3,502,648) and 3 g. of anhydrous sodium carbonate in 40 ml. of dimethylformamide was heated at reflux for 5 min. The solvent was distilled under vacuum. The residue was crystallized from methanol affording 370 mg. (45.2% yield) of methyl 6,7(R)-aziridino-7-deoxy-α-thiolincosaminide; M.P. 192-198° C. A second crop of crystals, M.P. 182-189°, 160 mg. (18.5%), was obtained on concentration of the mother liquors. Two recrystallizations from methanol-acetone gave crystals, M.P. 203-220° C., $[\alpha]_D +320°$ (dimethyl sulfoxide). On further recrystallization the melting point is increased to 220-222° C.

*Analysis.*—Calcd. for $C_9H_{17}NO_4S$ (percent): C, 45.94; H, 7.28; N, 5.95. Found (percent): C, 45.97; H, 7.44; N, 6.19.

PART B-1

Methyl 7(S)-mercapto-7-deoxy-α-thiolincosaminide

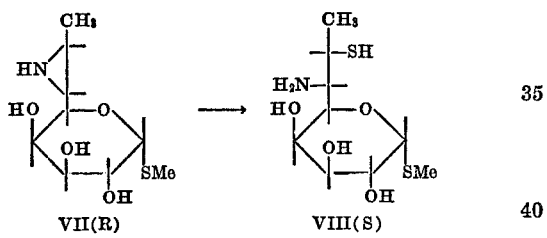

A mixture of 1.5 g. of methyl 6,7(R)-aziridino-7-deoxy-α-thiolincosaminide in 30 ml. of 2-propanol was saturated with $H_2S$ while cooling in a bath of ice-methanol. The reaction mixture was heated in a bomb on a steam bath for 5 hours. During this time methyl 6,7-aziridino-7-deoxy-α-thiolincosaminide gradually dissolved forming a solution from which crystalline methyl 7(S)-mercapto-7-deoxy-α-thiolincosaminide began to precipitate. Filtration of the cooled mixture gave 1.6 g. of methyl 7(S)-mercapto-7-deoxy-α-thiolincosaminide, M.P. 190-197° C. A portion was recrystallized from ethanol to form the analytical sample, M.P. 195-198° C.

*Analysis.*—Calcd. for $C_9H_{19}NO_4S_2$ (percent): C, 40.13; H, 7.11; N, 5.20; S, 23.80. Found (percent): C, 40.36; H, 7.12; N, 5.03; S, 24.21.

PART C-1

7(R)-mercapto-7-deoxylincomycin hydrochloride

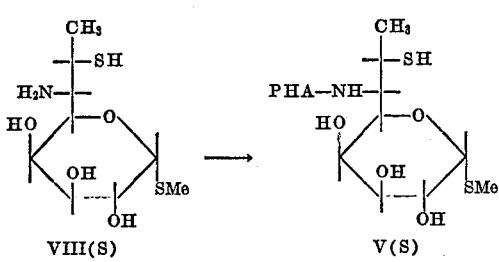

To a solution of 5.2 g. (25.2 mM.) of trans-1-methyl-4-n-propyl-L-proline hydrochloride and 7.16 ml. (51 mM.) of triethylamine in 250 ml. of acetonitrile cooled in an ice-methanol bath was added 3.42 ml. (25.2 mM.) of i-butyl chloroformate. After stirring for 20 minutes, a solution of 6.8 g. (25.2 mM.) of methyl 7(S)-mercapto-7-deoxy-α-thiolincosaminide in 100 ml. of water was added. The resulting reaction mixture was stirred at ambient temperature for 2 hrs. The organic solvent was distilled in vacuo and the residue extracted with methylene chloride. After drying the methylene chloride was distilled leaving a residue of 10.2 g. The crude oil was dissolved in 50 ml. of acetone and excess dilute HCl added. An additional 250 ml. of acetone was added causing the precipitation of a gummy solid. This precipitate hardened when triturated with 250 ml. of fresh acetone. It was collected by filtration. A 1 g. portion was chromatographed over silica gel using methanol-chloroform 1:4 for elution. The fractions showing antibacterial activity were pooled and evaporated to dryness. This material (307 mg.) was dissolved in acetone and acidified. Evaporation of the solvent gave 7(S)-mercapto-7-deoxylincomycin hydrochloride as a glassy solid.

*Analysis.*—Calcd. for $C_{18}H_{34}N_2O_5S_2 \cdot HCl$ (percent): C, 47.09; H, 7.69; N, 6.10. Found (percent): C, 47.25; H, 7.87; N, 5.60.

Antibacterial spectrum: Mcg./ml.[1]

| | |
|---|---|
| Streptococcus faecalis | 1.6 |
| Streptococcus hemolyticus | 0.8 |
| Streptococcus faecalis | 1.6 |
| Bacillus subtilis | 6.4 |
| Gram negative | >200 |

[1] Two-fold dilution end points in brain-heart infusion broth at 20 hours.

EXAMPLE 2

7(R)-mercapto-7-deoxylincomycin hydrochloride

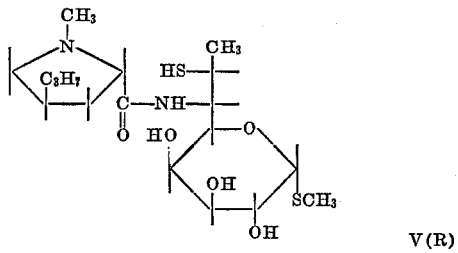

PART A-2a

Methyl 6,7(S)-aziridino-7-deoxy-α-thiolincosaminide

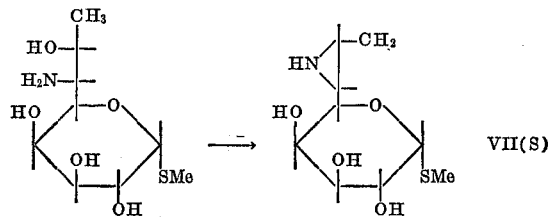

Chlorine (52.5 g.) was passed into a cooled solution of 197.2 g. of triphenylphosphine in 1.5 l. of anhydrous acetonitrile. To this solution was added 18.7 g. of methyl α-thiolincosaminide (Example 1 U.S. Patent 3,179,565). The mixture was stirred for 2.5 hrs. at ambient temperature and then 50 ml. of methanol added. The solution was evaporated under vacuum. The residue was dissolved in methylene chloride and washed 3 times with water. The aqueous extract was made alkaline with aqueous sodium hydroxide containing ice and extracted 4 times with methylene chloride. The methylene chloride solution was dried over anhydrous sodium sulfate and evaporated to dryness. The residue was chromatographed over silica gel using chloroform-methanol (4:1) for elution and taking 100 ml. fractions. The effluent was monitored by TLC (thin layer chromatography) and fractions were combined on this basis. There was obtained 4.4 g. of material which was essentially methyl 7(S)-chloro-7-deoxy-α-thiolincosaminide and 3.2 g. of a fraction containing this product and a slightly more polar product. This latter fraction when triturated in methanol afforded 2.48 g. of methyl 7(S)-chloro-7-deoxy-α-thiolincosaminide. The methanol solution was evaporated to dryness and the residue rechromatographed over silica gel to give 700 mg. of methyl 6,7(S)-aziridino-7-deoxy - α - thiolincosaminide (slightly more polar than methyl 7(S)-chloro-7-deoxy-α-thiolincosaminide) which on crystallization from methanol gave 230 mg. of crystals having the following characteristics: M.P. 186–189° C., [α]$_D$ +281° (dimethsulfoxide).

*Analysis.*—Calcd. for $C_9H_{17}NO_4S$ (percent): C, 45.94; H, 7.28; N, 5.95; S, 13.63. Found (percent): C, 45.85; H, 7.24; N, 6.28; Cl, 0.

PART A–2b

Methyl 6,7(S)-aziridino-7-deoxy-α-thiolincosaminide

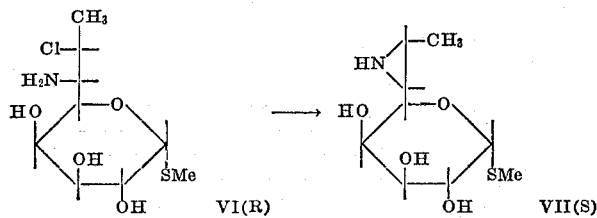

Following the procedure of Example 1, Part A–1, substituting the methyl 7(S)-chloro-7-dexoy-α-thiolincosaminide by methyl 7(R)-chloro-7-deoxy-α-thiolincosaminde, there is obtained methyl 6,7(S)-aziridino-7-deoxy-α-thiolincosaminide.

PART B–2

Methyl 7(R)-mercapto-7-deoxy-α-thiolincosaminide

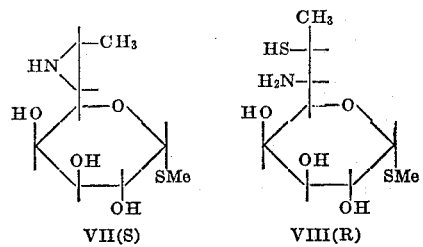

Following the procedure of Example 1, Part B–1, substituting the methyl 6,7(R)-aziridino-7-deoxy-α-thiolincosaminide by methyl 6,7(S)-aziridino-7-deoxy-α-thiolincosaminide, there is obtained methyl 7(R)-mercapto-7-deoxy-α-thiolincosaminide.

PART C–2

7(R)-mercapto-7-deoxylincomycin hydrochloride

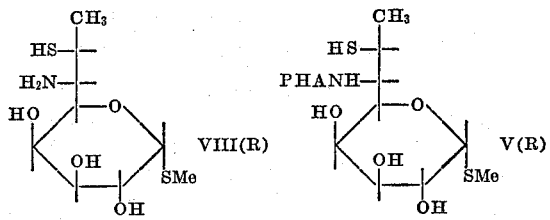

On acylation with trans-1-methyl-4-n-propyl-L-proline as in Example 2, Part F–2, of the parent application, there is obtained 7(R)-mercapto-7-deoxylincomycin hydrochloride having the same characteristics as that produced in Example 2, Part F–2 of the parent application.

We claim:
1. A compound of the formula:

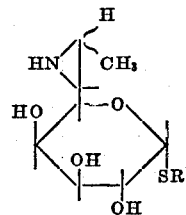

where R is alkyl of not more than 20 carbon atoms, cycloalkyl of 3 to not more than 8 carbon atoms, or aralkyl of not more than 12 carbon atoms.

2. A compound according to claim 1 wherein R is methyl or ethyl.

3. A compound according to claim 1 with the 7(R)-configuration.

4. A compound according to claim 2 with the 7(R)-configuration.

5. A compound according to claim 1 with the 7(S)-configuration.

6. A compound according to claim 2 with the 7(S)-configuration.

7. The process for making a compound of the formula:

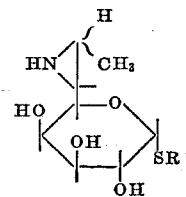

where R is alkyl of not more than 20 carbon atoms, cycloalkyl of from 3 to not more than 8 carbon atoms or aralkyl of not more than 12 carbon atoms which comprises heating a solution of a compound of the formula:

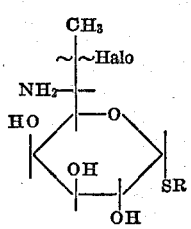

where Halo is chlorine, bromine, or iodine, in the presence of an acid acceptor for the hydrogen halide liberated in the reaction at a reactive temperature below that at which substantial decomposition would take place.

8. The process of claim 7 in which the acid acceptor is anhydrous sodium carbonate.

9. The process of making compounds of the formula:

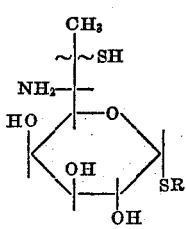

wherein R is alkyl of not more than 20 carbon atoms, cycloalkyl of 3 to not more than 8 carbon atoms, or aralkyl of not more than 12 carbon atoms which comprises heating a solution of a compound of the formula:

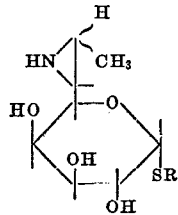

under pressure of hydrogen sulfide at a reaction temperature below that at which substantial decomposition would take place.

10. The process of claim 7 in which the product is heated in solution under pressure of hydrogen sulfide.

11. The process of claim 8 in which the product is heated in solution under pressure of hydrogen sulfide.

References Cited
UNITED STATES PATENTS 3,380,992   4/1968   Argoudelis et al. --- 260—210 R
3,459,734   8/1969   Magerlein -------- 260—210 R LEWIS GOTTS, Primary Examiner J. R. BROWN, Assistant Examiner U.S. Cl. X.R.

260—9 R, 999

UNITED STATES PATENT OFFICE
CERTIFICATE OF CORRECTION

Patent No. 3,689,474      Dated September 5, 1972

Inventor(s) Fred Kagan and Barney J. Magerlein

It is certified that error appears in the above-identified patent and that said Letters Patent are hereby corrected as shown below:

Column 4, line 11, for "muic" read -- mucic --; line 11, for "amphoric" read -- camphoric --; line 16, for "benzensulfonic" read -- benzenesulfonic --. Column 5, line 59, for "7(R)-" read -- 7(S)- --. Column 6, line 23, for "Streptococcus faecalis" read -- Staphylococcus aureus --. Column 7, line 13, for "(dimethsulfoxide)" read -- (dimethylsulfoxide) --.

Signed and sealed this 8th day of May 1973.

(SEAL)
Attest:

EDWARD M. FLETCHER, JR.      ROBERT GOTTSCHALK
Attesting Officer      Commissioner of Patents